United States Patent [19]

Palesotti

[11] Patent Number: 4,596,215
[45] Date of Patent: Jun. 24, 1986

[54] DRAG RACER COMPETITION CONTROL SYSTEM

[76] Inventor: Anthony L. Palesotti, 4198 N. Shore Dr., Orono, Minn. 55364

[21] Appl. No.: 755,832

[22] Filed: Jul. 16, 1985

[51] Int. Cl.⁴ .............................................. F02P 9/00
[52] U.S. Cl. .................................. 123/335; 123/349; 123/350; 180/333
[58] Field of Search ............... 123/319, 330, 331, 332, 123/333, 334, 335, 349, 350, 351, 352; 180/333

[56] References Cited

U.S. PATENT DOCUMENTS 4,336,778 6/1982 Howard .............................. 123/334

*Primary Examiner*—Andrew M. Dolinar
*Attorney, Agent, or Firm*—Kinney & Lange

[57] ABSTRACT

A control system for a drag race vehicle limits engine RPM to a selected Launch RPM limit when the vehicle is staged at the starting line and which limits engine RPM to an Elapsed Time RPM limit after the vehicle is shifted to high gear. The Launch RPM control is controlled by the same driver-controlled Launch switch which controls the line lock or transmission brake solenoid, so that the Launch RPM limit is removed at the same time that the vehicle is permitted to move forward. The Elapsed Time RPM control is actuated by a second driver-controlled Elapsed Time Enable switch. The control system is particularly useful for Super Class drag racers, in which the winner must be the first to the finish line without going under a predetermined elapsed time.

8 Claims, 1 Drawing Figure

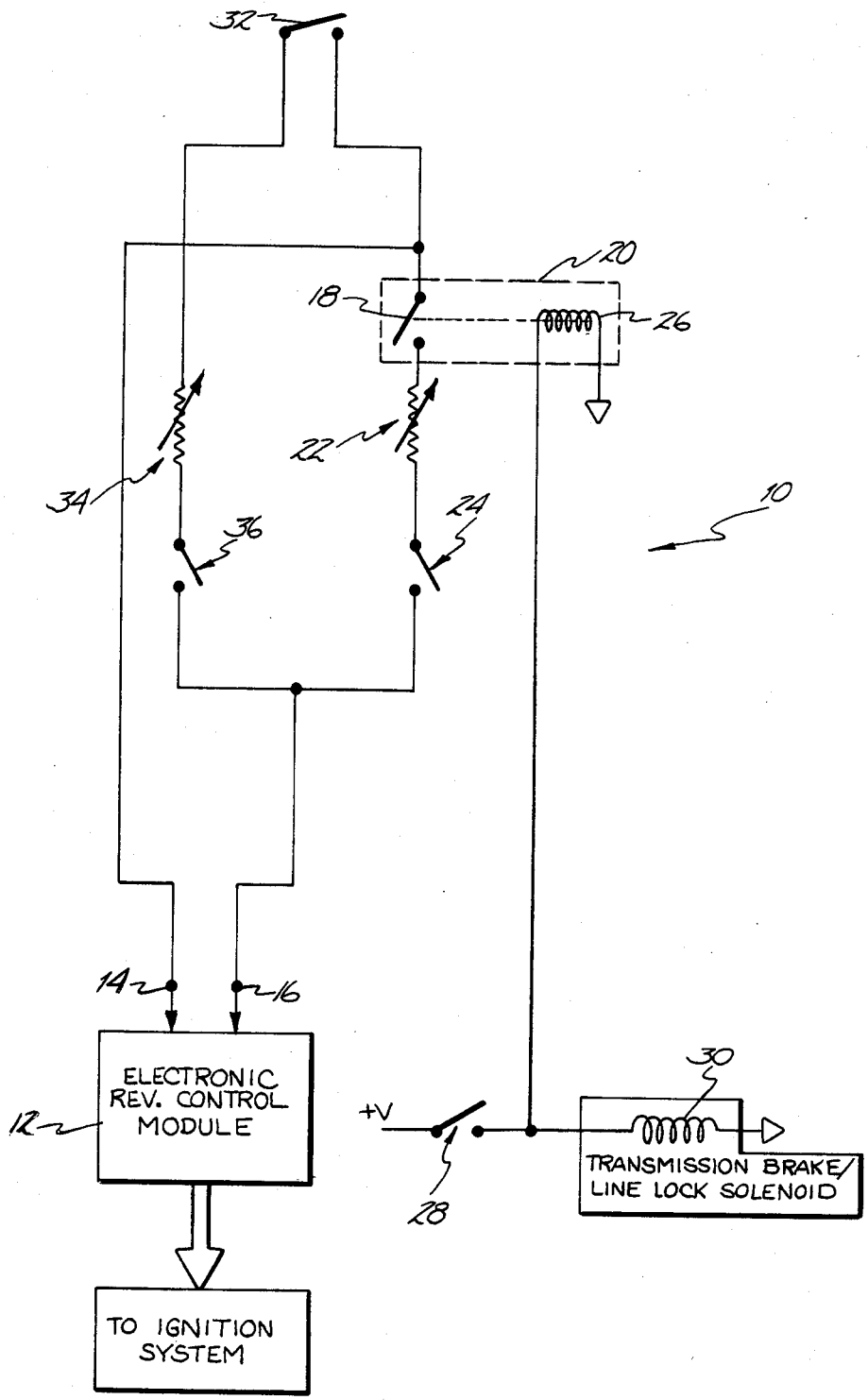

DRAG RACER COMPETITION CONTROL SYSTEM

BACKGROUND OF THE INVENTION

1. Field of the Invention

The present invention relates to a control system for controlling operation of a drag racing vehicle.

2. Description of the Prior Art

Over the years, drag racing has been very popular among both participants and spectators. Various classes have been developed so that vehicles of similar capability compete with one another, and the skill of the driver remains an important factor in the outcome of every race.

One particularly challenging type of drag race is run in the "Super Classes", which include Super Gas, Super Comp, and Super Street. In each of these classes, the vehicle must qualify by running the quarter mile in less than a predetermined elapsed time. During the actual races, however, the winner must be first to the finish line without going below that same elapsed time. For example, in the Super Gas Class the vehicle must be capable of running the quarter mile in an elapsed time of less than 9.9 seconds, but during the races that same vehicle must not go below 9.9 seconds elapsed time.

The Super Classes, therefore, present a definite challenge to the driver—the time from beginning to end of the race is very short; the race must be won; and yet the overall speed of the vehicle must be limited. It is extremely difficult to obtain consistency in running these races since they are highly dependent on the driver's reaction time.

In the past, several approaches have been used in an attempt to obtain better performance and more consistency in running races in the Super Classes. One approach has been to back off the throttle linkage by the use of mechanical throttle stops. While this will limit the overall speed of the vehicle, it results in a loss of horsepower at the starting line as well as at the end of the track. The loss of horsepower at the beginning of the race prevents the racer from getting a quick start off of the line—which is where most of the races are won or lost.

The second approach has been to limit the opening of the secondary throttle plates of a four barrel carburetor. While this does not limit horsepower at the starting line, it does cause a loss of horsepower as the engine reaches higher RPM just before shifting to high gear.

A third approach uses a hydraulically actuated solenoid that pushes the accelerator pedal up once the vehicle is shifted into high gear. The solenoid is operated based upon line pressure in the automatic transmission. There is a problem with this approach, as well as the first two approaches, in that there is no manual override capability by which the driver can increase RPM and speed as he approaches the finish line. If, because of a slow start, the vehicle was behind in the race and does not run the risk of going below the specified elapsed time, each of these prior art approaches will prevent the driver from increasing speed in order to catch up and win the race.

SUMMARY OF THE INVENTION

The present invention is an improved control system for a drag racing vehicle which helps to eliminate human variables at the starting line and improve the overall performance of the driver and the vehicle in the race.

The system of the present invention includes Launch RPM control means which limits the RPM of the engine to a selected Launch RPM level. The Launch RPM control means is connected to the transmission brake or line lock solenoid which holds the vehicle in position at the starting line. A driver-controlled Launch switch controls the actuation of both the means for holding the vehicle in place and the Launch RPM control means. When the Launch switch is released, it deactivates both the Launch RPM control means and the solenoid which holds the vehicle in place, so that the vehicle can accelerate rapidly off the starting line.

The control system of the present invention also preferably includes an Elapsed Time control means which limits the engine RPM of the vehicle to a selected Elapsed Time RPM limit. A driver-controlled Elapsed Time Enable switch determines when the Elapsed Time control means is in operation. The driver normally actuates the Elapsed Time Enable switch to limit the RPM of the engine after the transmission is shifted to high gear. The driver can also deactivate the Elapsed Time control means to allow the vehicle to accelerate further in order to catch up and win the race.

The control system in the present invention provides much greater consistency because it eliminates human variables—particularly at launch. Unlike prior art techniques, it does not rob horsepower either at launch or at the shift point into high gear.

BRIEF DESCRIPTION OF THE DRAWING

The FIGURE is an electrical diagram of the drag racer competition control system of the present invention.

DETAILED DESCRIPTION OF THE PREFERRED EMBODIMENTS

Drag racer competition control system 10 shown in the FIGURE is an electrical control system which can be used by the driver of a drag racing vehicle to achieve a preselected Launch RPM and a preselected Elapsed Time RPM (which occurs after the shift to high gear to control the overall elapsed time of the vehicle in the quarter mile). System 10 includes an electronic revolution control module 12 (such as an MSD 8728) which is connected to the ignition system of the vehicle's engine to limit the maximum RPM of the engine to a predetermined level. Electronic revolution control module 12 has a pair of terminals 14 and 16. The resistance between terminals 14 and 16 determines the maximum RPM level set by control module 12. When control module 12 is an MSD 8728, the higher the resistance across terminals 14 and 16, the higher the RPM limit. With other known control modules, however, there is an inverse relationship between resistance and RPM limit. Either type of control module is usable in the control system of the present invention.

Connected in a first loop between terminals 14 and 16 are relay contacts 18 of relay 20, Launch RPM potentiometer 22, and first select switch 24. Coil 26 of relay 20 has one terminal connected to ground and the other terminal connected between first driver-controlled Launch switch 28 and coil 30 of the transmission brake or line lock solenoid of the vehicle. When switch 28 is held closed by the drive, both coil 26 and coil 30 are energized. This causes relay contacts 18 to close and also causes the transmission brake or line lock solenoid to be actuated (which prevents the vehicle from moving forward). If first select switch 24 is also closed when relay contacts 18 are closed, the first loop will be closed, thereby connecting launch RPM potentiometer 22 across terminals 14 and 16. This causes module 12 to limit the engine RPM to the Launch RPM limit, even though the accelerator pedal is held to the floor. When Launch switch 28 is released by the drive, it opens (preferably by spring-loaded action) thereby deenergizing coils 26 and 30. This releases the transmission brake or line lock solenoid and also opens relay contacts 18, thus disconnecting Launch RPM potentiometer 22 from across terminals 14 and 16 (and removing the Launch RPM limit).

A second loop connected between terminals 14 and 16 contains Elapsed Time Enable switch 32, Elapsed Time RPM potentiometer 34, and second select switch 36. When second select switch 36 is closed, and Elapsed Time Enable switch 32 is held closed by the driver, Elapsed Time RPM potentiometer 34 is connected across terminals 14 and 16. If Elapsed Time Enable switch 32 is released (preferably by spring-loaded action), it returns to an open state to open the second loop and cause module 12 to remove the Elapsed Time RPM limit.

The following is a typical sequence for running a race in which the competition control system 10 of the present invention is used.

First, the two vehicles which are racing are "prestaged". At this time, the vehicles are rolled forward toward the starting line. When the first vehicle breaks a light beam, its prestage light goes on telling the driver and crew that the first vehicle is prestaged. The second vehicle is then moved forward to break a similar light beam and its prestage light goes on as well. Both vehicles must be prestaged before either can be "staged".

The next step is to "stage" the two vehicles. Both vehicles are rolled up to the starting line and, at that point, are ready to start the race. After both vehicles have been staged, the official who acts as a starter can start the race at any time. In the Super Classes, two starting lights are used, an amber light, which is lit first, followed 0.4 seconds later by the green light. The vehicles can leave the starting line when the green light comes on.

When the vehicle has been staged, the driver holds Launch switch 28 closed, which energizes coil 30 of the transmission brake or line lock solenoid. This locks the vehicle in place, and prevents it from moving forward regardless of how fast the engine is running.

When first select switch 24 in the first loop is closed and first driver-controlled switch 28 is held closed by the driver, coil 36 is energized, thus closing the relay contacts 18. This connects Launch RPM potentiometer 22 across terminals 14 and 16. At that point, the driver can release the foot brake and floorboard the accelerator pedal, and the engine will be limited to the Launch RPM selected by Launch RPM potentiometer 22.

When the driver sees the amber light, he releases Launch switch 28 which deenergizes coils 26 and 30. This releases the transmission brake or line lock solenoid and also removes the Launch RPM limit.

The vehicle then begins moving forward down the track, with the RPM of the engine increasing. When the transmission shifts into high gear, the driver then closes Elapsed Time Enable switch 32, which connects Elapsed Time RPM potentiometer 34 across terminals 14 and 16. Assuming that second select switch 36 is closed, the resistance selected by Elapsed Time RPM potentiometer 34 determines the Elapsed Time RPM limit, and the driver simply presses the accelerator pedal to the floorboard for the remainder of the race. If the driver is losing the race, he can remove the Elapsed Time RPM limit caused by Elapsed Time RPM potentiometer 34 simply by releasing Elapsed Time Enable switch 32.

The most critical part of the race is usually the launch. The driver's reaction and ability to quickly leave the starting line is often the determining factor in the outcome of the race. With the present invention, the Launch RPM limit can be selected to compensate for track conditions, weather conditions, temperature conditions, and driver habits. Control system 10 also reduces the number of human variables at launch. In order to start off the line, the driver must do only one thing, namely release Launch switch 28. That automatically releases the transmission brake or line lock solenoid and also removes the Launch RPM limit. Since the engine RPM has been limited at the starting line to the Launch RPM limit, the driver has been able to hold the accelerator pedal to the floorboard. When Launch switch 28 is released, therefore, the driver does not have to move his foot at all to accelerate. This occurs automatically as soon as the Launch RPM limit is removed and the transmission brake or line lock solenoid is released.

The Elapsed Time RPM limit which is provided with control system 10 of the present invention results in a very consistent race being run. It is particularly useful in the Super Classes, where there is a predetermined minimum elapsed time which is required. The ability to release Elapsed Time Enable switch 32 and remove the Elapsed Time RPM limit is very important, since situations can arise when the driver must override the Elapsed Time RPM limit if he is to have any chance of winning the race.

The Elapsed Time RPM limit adjustment is normally made during trial runs before the race. Elapsed Time Enable switch 32 is not used during the qualifying runs in the Super Classes, since during qualification the car must run the quarter mile in less than the predetermined elapsed time. Selecting the desired Elapsed Time RPM limit does not require movement of mechanical stops or the adjustment of any mechanical parts. Instead, the driver merely adjusts a Elapsed time RPM potentiometer 34.

In preferred embodiments, the Elapsed Time RPM potentiometer 34 is much higher resolution than Launch RPM potentiometer 22. For example, in one embodiment Elapsed Time RPM potentiometer 34 was a ten-turn potentiometer while Launch RPM potentiometer 22 was a one-turn potentiometer.

As described previously, switches 28 and 32 are preferably spring loaded switches, which are normally open and must be held close by the driver. This allows the driver to very rapidly release switch 28 at the time of launch and switch 32 at a point where the Elapsed Time RPM limit must be removed in order to win the race.

The control system 10 of the present invention has been used successfully in a Super Gas Opel Kadett with a 475 cubic inch Chevrolet V8 engine and an automatic transmission. In this particular car, the Launch RPM limit was typically set at about 5000 RPM, the Elapsed Time RPM limit was typically set at about 7300 RPM, and the shift point of the automatic transmission into high gear was typically set to occur at about 7500 RPM.

Although the present invention has been described with reference to preferred embodiments, workers skilled in the art will recognize that changes may be made in form and detail without departing from the spirit and scope of the invention.

What is claimed is:

1. For use in a drag racing vehicle which has means for preventing movement of the vehicle when the vehicle is at a starting line and a first driver-controlled switch for controlling operation of the means for preventing movement, the improvement comprising:
    Launch RPM control means for limiting engine RPM of the vehicle to a selected Launch RPM limit, the Launch RPM control means being operably connected to the first driver-controlled switch to be operable simultaneously with the means for preventing movement.

2. The invention of claim 1 further comprising:
    Elapsed Time RPM control means for limiting engine RPM of the vehicle to an Elapsed Time RPM limit; and
    a second driver-controlled switch for selectively enabling the Elapsed Time RPM control means.

3. The invention of claim 1 wherein the Launch RPM control means comprises:
    engine RPM control means connected to an ignition system of the vehicle for limiting engine RPM as a function of an impedance connected between a pair of terminals;
    first adjustable impedance means for providing a first adjustable impedance representative of the selected Launch RPM limit; and
    means for selectively connecting the first adjustable impedance means to the pair of terminals as a function of a state of the first driver-controlled switch.

4. The invention of claim 3 wherein the first driver-controlled switch has a first state in which the means for preventing movement on the vehicle is actuated and a second state in which the means for preventing movement is deactuated, and wherein the means for selectively connecting is responsive to the state of the first dirver-controlled switch to connect the first adjustable impedance means to the pair of terminals when the first-driver controlled switch has the first state and disconnects the first adjustable impedance means from the pair of terminals when the first driver-controlled switch has a second state.

5. The invention of claim 3 and further comprising:
    second adjustable impedance means for providing a second adjustable impedance representative of an Elapsed Time RPM limit; and
    a second driver-controlled switch for selectively connecting the second adjustable impedance means to the pair of terminals.

6. A control system for a drag racing vehicle comprising:
    a solenoid means for preventing movement of the vehicle when energized;
    engine RPM control means connected to an ignition system of the vehicle for limiting engine RPM to a selected value as a function of an impedance connected to the engine RPM control means;
    Launch RPM impedance means for providing a first impedance representative of a selected Launch RPM limit;
    a driver-controlled Launch switch having a first state and a second state, the Launch switch being connected to the solenoid means so that the solenoid means is energized when the Launch switch has a first state and is deenergized when the Launch switch has a second state; and
    means for connecting the Launch RPM impedance means to the engine RPM control means to cause the engine RPM to be limited to the selected Launch RPM limit when the Launch switch has the first state and for disconnecting the Launch RPM impedance means from the engine RPM control means when the Launch switch has the second state.

7. The invention of claim 6 and further comprising:
    Elapsed Time RPM impedance means for providing a second impedance representative of an Elapsed Time RPM limit; and
    a driver-controlled Elapsed Time Enable switch for selectively connecting the Elapsed Time RPM impedance means to the engine RPM control means to cause the engine RPM to be limited to the Elapsed Time RPM limit.

8. The invention of claim 7 wherein the Launch RPM impedance means and the Elapsed Time RPM impedance means comprise first and second potentiometers, respectively.

* * * * *